(12) United States Patent
Rothkopf et al.

(10) Patent No.: US 8,744,098 B2
(45) Date of Patent: Jun. 3, 2014

(54) USING AN AUDIO CABLE AS AN INDUCTIVE CHARGING COIL

(75) Inventors: Fletcher R. Rothkopf, Los Altos, CA (US); Anna-Katrina Shedletsky, Sunnyvale, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 12/700,518

(22) Filed: Feb. 4, 2010

(65) Prior Publication Data

US 2011/0188677 A1    Aug. 4, 2011

(51) Int. Cl.
*H04R 25/00* (2006.01)
*H02J 7/00* (2006.01)

(52) U.S. Cl.
USPC ............... 381/150; 381/384; 320/108

(58) Field of Classification Search
USPC ............... 381/150, 384, 381; 320/108
See application file for complete search history.

(56) References Cited

U.S. PATENT DOCUMENTS

| | | | |
|---|---|---|---|
| 7,164,255 B2 | 1/2007 | Hui | |
| 2003/0048254 A1* | 3/2003 | Huang | 345/163 |
| 2004/0073275 A1* | 4/2004 | Maltan et al. | 607/57 |
| 2005/0116684 A1 | 6/2005 | Kim | |
| 2006/0087282 A1* | 4/2006 | Baarman et al. | 320/108 |
| 2006/0215868 A1* | 9/2006 | Okamura et al. | 381/381 |
| 2007/0041275 A1* | 2/2007 | Barras et al. | 368/14 |
| 2008/0049963 A1* | 2/2008 | Mann et al. | 381/384 |
| 2008/0103407 A1* | 5/2008 | Bolea et al. | 600/529 |
| 2008/0153543 A1* | 6/2008 | Newman et al. | 455/556.1 |
| 2008/0186241 A1* | 8/2008 | Christensen | 343/718 |
| 2008/0263579 A1* | 10/2008 | Mears et al. | 725/9 |
| 2010/0149041 A1* | 6/2010 | Asraff et al. | 343/700 MS |
| 2010/0194336 A1* | 8/2010 | Azancot et al. | 320/108 |

FOREIGN PATENT DOCUMENTS

| | | |
|---|---|---|
| WO | 0143491 A1 | 6/2001 |
| WO | 2009047769 A2 | 4/2009 |

* cited by examiner

*Primary Examiner* — Duc Nguyen
*Assistant Examiner* — Phan Le
(74) *Attorney, Agent, or Firm* — Kilpatrick Townsend & Stockton LLP

(57) ABSTRACT

The disclosed embodiments relate to a technique for inductively charging an electronic device. This technique involves winding an audio cable for the electronic device around a charging mechanism multiple times so that one or more conductors in the audio cable form an inductive receiving coil. Next, a magnetic field is created through the charging mechanism to induce a current in the inductive receiving coil. Finally, the induced current in the inductive receiving coil is used to charge a rechargeable battery for the electronic device.

11 Claims, 7 Drawing Sheets

USING AN AUDIO CABLE AS AN INDUCTIVE CHARGING COIL

BACKGROUND

1. Field

The disclosed embodiments generally relate to techniques for charging portable electronic devices. More specifically, the disclosed embodiments relate to a technique that uses an audio cable as an inductive charging coil for a portable electronic device.

2. Related Art

Rechargeable batteries are presently used to provide power to a wide variety of portable electronic devices, including digital music players, cell phones, PDAs, laptop computers, and cordless power tools. These rechargeable batteries are typically charged through a direct conductive connection between a transformer, which is connected to either wall power or a car battery, and the portable electronic device.

Inductive charging techniques, which operate without requiring direct conductive connections, have been developed for certain applications, such as electric toothbrushes, where the proximity to water makes a conductive connection impractical. An electric toothbrush can be recharged using a relatively small inductive receiving coil because it is typically placed in a charging stand for a long period of time (many hours) and is only used for a short period of time (about two minutes).

However, to inductively charge other types of electronic devices (such as portable media players or cell phones) at an acceptable rate, a significantly larger receiving coil is required. Providing this larger receiving coil involves either incorporating the larger receiving coil into the portable electronic device, which increases the size of the portable electronic device, or alternatively incorporating the larger receiving coil into a bulky attachment to the portable electronic device.

Hence, what is needed is a technique for inductively charging portable electronic devices without the above-described problems.

SUMMARY

The disclosed embodiments relate to a technique for inductively charging an electronic device. This technique involves winding an audio cable for the electronic device around a charging mechanism multiple times so that one or more conductors in the audio cable form an inductive receiving coil. Next, a magnetic field is created through the charging mechanism to induce a current in the inductive receiving coil. Finally, the induced current in the inductive receiving coil is used to charge a rechargeable battery for the electronic device.

In some embodiments, after winding the audio cable around the charging mechanism, the technique further involves electrically coupling a first contact, which is coupled to the one or more conductors in the audio cable, to a second contact associated with the electronic device to complete a circuit between the inductive receiving coil and the electronic device.

In some embodiments, the second contact is located on a body of the electronic device. In further variation, the second contact comprises a conductive body of the electronic device.

In some embodiments, the first contact is located on a first earphone (e.g., an earbud) which is attached to the audio cable. In a further variation, the first contact is conductive metal mesh screen that also protects a driver for the first earphone.

In some embodiments, the second contact is located on a second earphone which is also attached to the audio cable. In a further variation, electrically coupling the first and second contacts involves electrically coupling the first and second contacts through an intervening conductor, wherein the intervening conductor is located in a housing which is configured to hold the first and second earphones.

In some embodiments, the one or more conductors within the audio cable include multiple conductors which are coupled in series to form a single receiving coil having more windings than an audio cable with only a single conductor.

In some embodiments, the audio cable comprises: a headphone cable; an earphone cable; or a microphone cable.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Charging Technique

Figure 1:
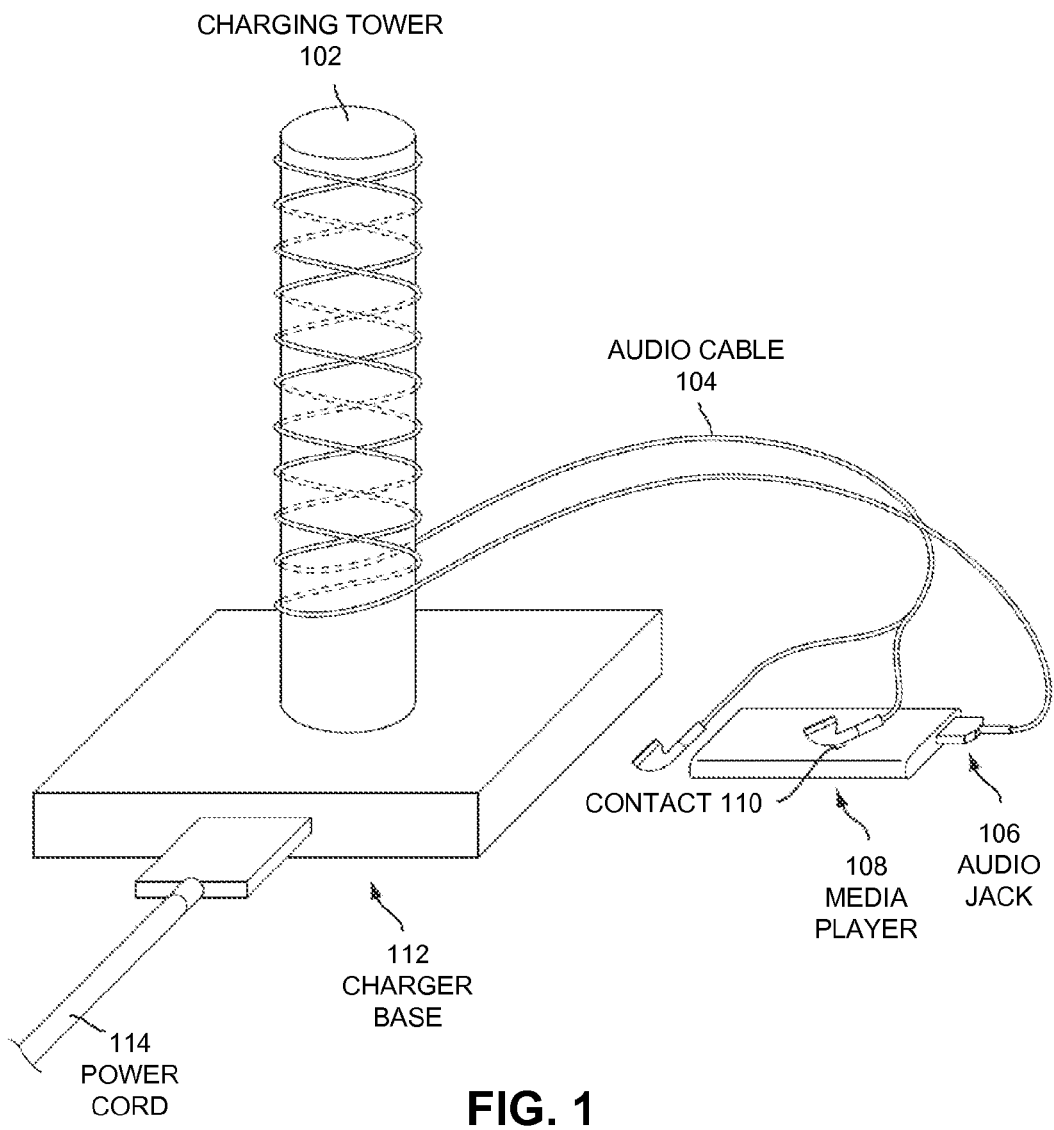
FIG. 1 illustrates how a charging tower is used to inductively charge a portable electronic device in accordance with the disclosed embodiments.

The disclosed embodiments use an audio cable of a portable music player as the "receiving" coil (or receiving loop) of an inductive charger. More specifically, FIG. 1 illustrates how a charging tower 102 can be used to inductively charge a portable electronic device, such as a media player 108. As illustrated in FIG. 1, charging tower 102 is coupled to a charger base 112, which receives power through a power cord 114. (Note that charging tower 102 is described in more detail below with reference to FIG. 2.) One contact for the receiving coil is on the body of media player 108, and other contact 110 is located on one of the earphones.

During the charging process, a user keeps the audio jack 106 attached to media player 108. The audio cable 104 for the headphone is then wrapped around charging tower 102. Note that charging tower 102 contains inductive "transmitting" coils, which are similar to transmitting coils in existing inductive charging systems, such as a rechargeable toothbrush. Next, the user attaches a contact from one of the earphones (by magnetic or other connector) back to the media player 108 to complete the inductive receiving coil.

In an alternative embodiment, instead of completing the inductive receiving coil by coupling a contact on one earphone to an associated contact located on media player 108, the inductive receiving coil is completed by coupling together two contacts located on the earphones. In this case, each earphone has a contact which is coupled to a different set of conductors in the audio cable, and the act of coupling the contacts together completes the inductive receiving coil.

Note that the speed of the inductive charging generally increases with the length of the inductive receiving coil. Consequently, a long receiving coil is desirable to achieve a reasonable charging rate, and such longer receiving coils can be hard to provide in a small portable electronic device. In a sense, using audio cable 104 as the inductive receiving coil effectively provides a long receiving coil "for free," because the long audio cable 104 is already being used to carry audio signals. As an example of how cumbersome such receiving coils can become, the Palm Pre™ uses a bulky snap-on attachment to facilitate inductive charging. Moreover, for some extremely small media players, such as the iPod Shuffle™, the weight of the media player is approximately the same as the weight of the headphones and associated cable. Hence, by using the headphones as inductive coils, an extremely small media player can effectively use about half of its mass as a charging coil.

Charging Tower

Figure 2:
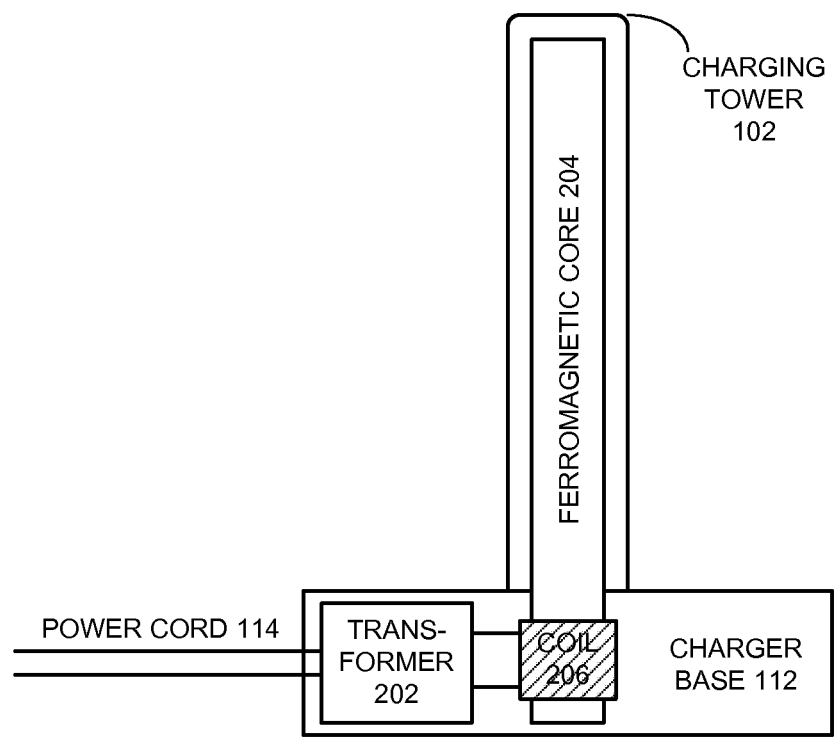
FIG. 2 illustrates the structure of a charging tower in accordance with the disclosed embodiments.

FIG. 2 illustrates the structure of charging tower 102 in accordance with the disclosed embodiments. Note that charging tower 102 is coupled to a charger base 112, which supports charging tower 102 and contains a transformer 202 and a transmitting coil 206. During operation, transformer 202 receives power through a power cord 114 which is coupled to a wall socket. Transformer 202 converts the voltage of the A/C power received from the wall socket and uses the resulting voltage to drive transmitting coil 206.

Transmitting coil 206 is wrapped around a ferromagnetic core 204 which runs the length of charging tower 102. A time-varying current flowing through transmitting coil 206 creates a varying magnetic flux in ferromagnetic core 204, which creates a time-varying magnetic field through a receiving coil that is wrapped around charging tower 102. This time-varying magnetic field induces a time-varying current in the receiving coil. Next, the time-varying current in the receiving coil is used to charge the associated electronic device. Note that using ferromagnetic core 204 improves the magnetic flux and hence improves the charging efficiency. However, the magnetic flux can also propagate through air, which means that the system can also work without a ferromagnetic core.

As mentioned previously, the receiving coil is formed by wrapping audio cable 104 around charging tower 102 and then attaching a first contact 110 (which can be located on an earphone of audio cable 104) to a second contact. This second contact can be located either on the body of the electronic device or on the other earphone of audio cable 104.

Also note that charging tower 102 is configured to allow a user to easily wrap audio cable 104 around the charging tower 102. For example, the surface of charging tower 102 can be textured (instead of smooth), or may contain grooves, to allow audio cable 104 to rest on charging tower 102 without slipping when audio cable 104 is wrapped around charging tower 102. Although the embodiment of charging tower 102 illustrated in FIG. 2 is cylindrical, any shape that audio cable 104 can be wrapped around can be used. For example, charging tower 102 may be conical. Also, instead of being oriented vertically, charging tower 102 can be oriented horizontally, or somewhere between horizontal and vertical.

Media Player

Figure 3:
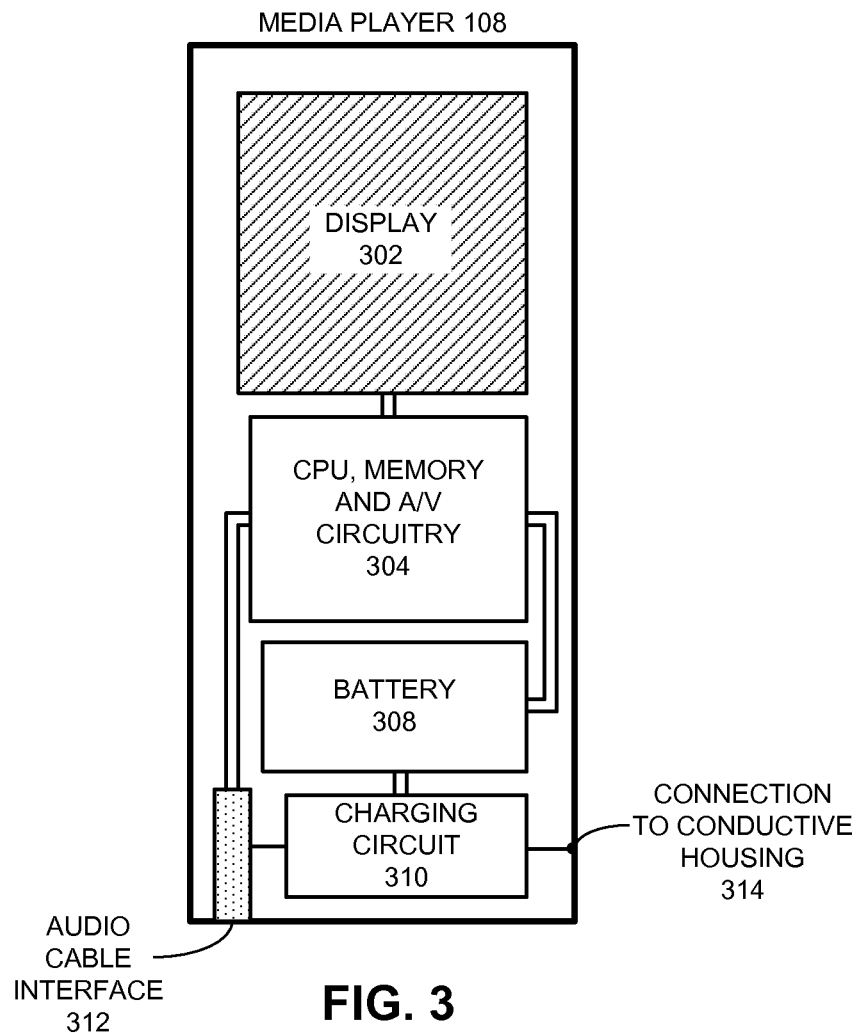
FIG. 3 illustrates a media player in accordance with the disclosed embodiments.

FIG. 3 illustrates the structure of a media player 108 in accordance with the disclosed embodiments. In general, the disclosed techniques will work with any type of portable electronic device that operates on battery power. For example, the portable electronic device can be a media player, such as an iPod™, which can play both audio or video files. The portable electronic device can also be a personal digital assistant (PDA), a cellular telephone, a smart phone, or even a portable computer system.

Audio cable 104 can include any type of cable which carries an audio signal. For example, audio cable 104 can include a headphone cable, an earphone cable or a microphone cable. Moreover, the disclosed techniques are not limited to audio cables. In general, the disclosed techniques can be used with any type of cable that is attached to a portable electronic device. For example, the disclosed techniques can also be used with a network interface cable or a video cable.

The media player 108 which is illustrated in FIG. 3 includes an audio cable interface 312, a charging circuit 310, a battery 308, a display 302 and a circuit block 304, which contains a CPU and a memory, as well as audio-visual (A/V) drivers. Battery 308 can include any type of rechargeable battery for a portable electronic device, such as a lithium-ion or lithium-polymer battery. Note that battery 308 provides power to all of the circuits in media player 108, including circuit block 304.

Circuit block 304 includes a CPU and a memory that enable media player 108 to play selected media files, such as audio files, image files or video files. These media files can be stored in non-volatile memory, or alternatively, in a magnetic storage device, such as a disk drive. Circuit block 304 also contains circuitry for driving a display and circuitry for driving earphones (or other types of audio output devices) that are coupled to an audio cable 104, wherein audio cable 104 is attached to audio cable interface 312.

Audio cable interface 312 also includes connections from one or more conductors in the audio cable 104 to charging circuit 310. Note that audio cable 104 can include one or more conductors, which are separate from the audio conductors, and are used to form the inductive receiving coil. Alternatively, audio cable 104 can use the same conductors which are used to carry audio signals to form the inductive receiving coil. (This alternative implementation requires some additional switching circuitry to enable the same conductors to carry both audio signals and inductive charging signals.)

Audio cable 104 can also include multiple conductors which are coupled in series (in a spiral arrangement) when the receiving coil is closed. This forms a single receiving coil having more windings than if the audio cable contained only a single conductor. Note that this implementation may require the contact 110 on audio cable 104 to provide multiple contacts which can be used to simultaneously connect the multiple coils into the spiral arrangement. Contact 110 may additionally include some type of magnetic connector which holds the contact against a corresponding opposing contact.

Charging circuit 310 is also electrically coupled through a connection 314 to the conductive housing of media player 108. This enables the entire conductive housing of media player 108 to function as a second contact to complete the inductive receiving coil. For example, the inductive receiving coil can be completed by placing a contact, which is located on an earphone of audio cable 104, on the conductive housing of media player 108.

During the charging process, charging circuit 310 uses a time-varying current, which is received through the inductive receiving coil, to recharge battery 308.

Electrical Contact through Earphone Mesh

Figure 4:
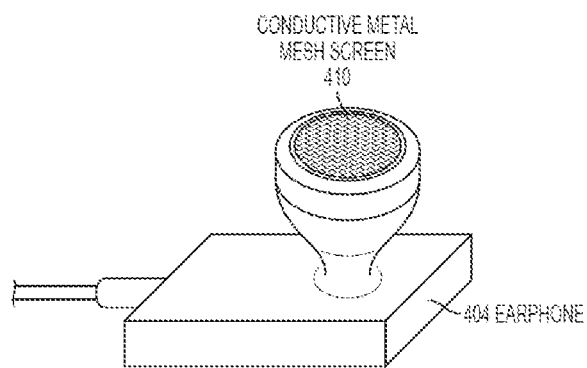
FIG. 4 illustrates an earphone in accordance with the disclosed embodiments.

FIG. 4 illustrates how an earphone 404 can include a conductive metal mesh screen 410 which also functions as an electrical contact. Note that this metal mesh screens also protects the driver for earphone 404. Also note that this type of electrical contact is different from the electrical contact 110 illustrated in FIG. 1, which is located on the housing of an earphone, and is separate from the screen which protects the earphone driver.

This type of electrical contact (through the earphone mesh) can also be used to receive current for a conventional non-inductive charging system. This eliminates the need to provide a separate interface to receive the charging current in a conventional charging system.

In one variation, this conductive metal mesh screen 410 includes a number of separate conductive regions which function as independent contacts. In this way, the metal mesh screen can provide multiple contacts instead of a single contact. These separate conductive regions can be created by fabricating the mesh using alternating regions of conductive metal wires and non-conductive plastic wires.

Alternative Embodiment

Figure 5:
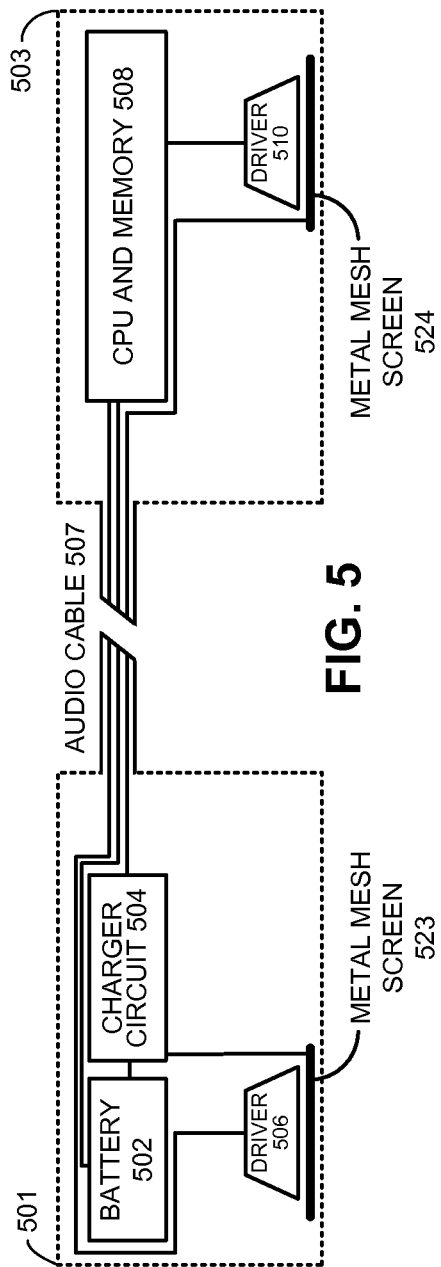
FIG. 5 illustrates an audio device in accordance with the disclosed embodiments.

An alternative embodiment for an audio player is illustrated in FIG. 5. As can be seen from FIG. 5, the circuitry for this alternative embodiment is integrated into two separate modules 501-503 which are coupled together by an audio cable 507. More specifically, module 501 includes an audio driver 506, a battery 502 and a charger circuit 504, wherein the charger circuit 504 is configured to charge battery 502. In contrast, module 503 includes a CPU and memory unit 508 which controls the operation of the audio player. During audio playback, the CPU and memory unit 508 generates audio signals which are transmitted to driver 510 in driver 503 and driver 506 in driver 501 (through audio cable 507).

Note that charger circuit 504 in module 501 receives one connection to the inductive receiving coil from metal mesh screen 523 (which protects driver 506 in module 501), and the other connection through audio cable 507 from metal mesh screen 524 (which protects driver 510 in module 503). After audio cable 507 is wound around a charging device, a conductive connection is established between metal mesh screen 523 and metal mesh screen 524 to complete the inductive receiving coil. For example, this conductive connection can be established through an intervening conductor. Alternatively, metal mesh screens 523 and 524 can be directly connected to each other to establish the conductive connection. Note that using metal mesh screens 523 and 524 as electrical contacts saves space because no additional connectors or contacts need to be provided.

Charging Process

Figure 6:
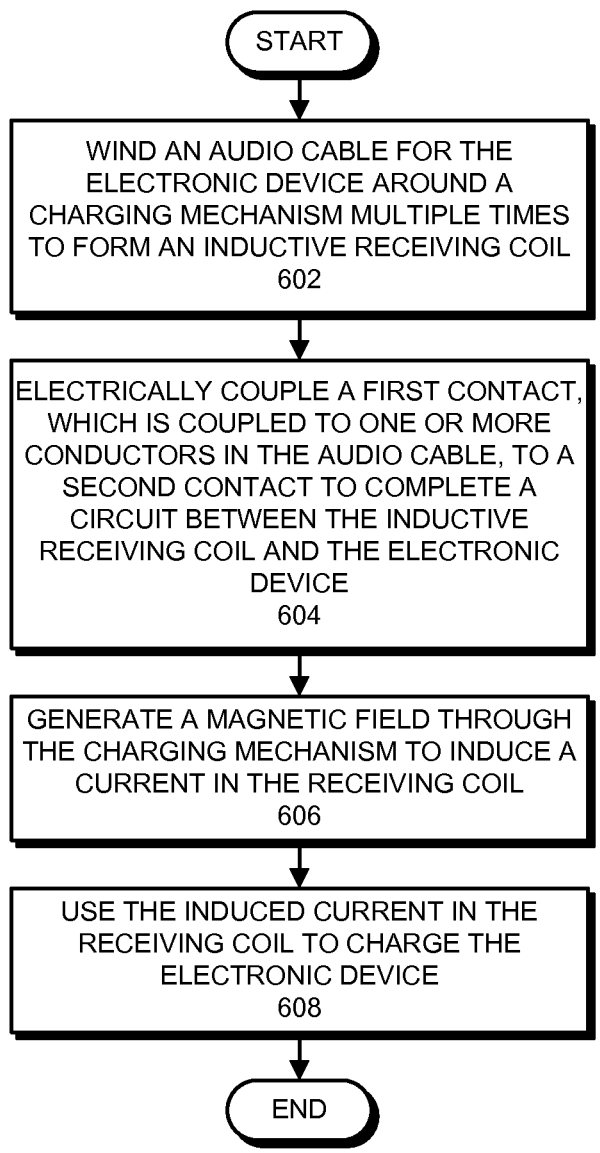
FIG. 6 presents a flow chart illustrating the process of using an audio cable as an inductive charging coil to charge a portable electronic device in accordance with the disclosed embodiments.

FIG. 6 presents a flow chart illustrating the process of using an audio cable as an inductive charging coil to charge a portable electronic device in accordance with the disclosed embodiments. At the start of the process, a user winds an audio cable for the electronic device around a charging mechanism multiple times so that one or more conductors in the audio cable form an inductive receiving coil (step 602). Next, the user connects a first contact, which is coupled to the one or more conductors in the audio cable, to a second contact to complete a circuit between the inductive receiving coil and the electronic device (step 604). A time-varying magnetic field is then generated through the charging mechanism to induce current in the inductive receiving coil (step 606). Finally, the induced current in the inductive receiving coil is used to charge a rechargeable battery for the electronic device (step 608).

Acoustic Charging

Figure 7:
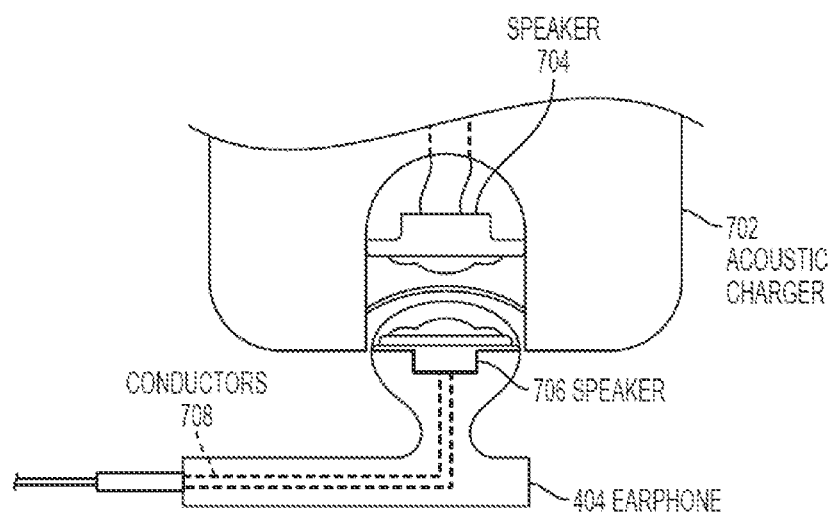
FIG. 7 illustrates an alternative charging system that uses an acoustic output to charge a portable media player in accordance with the disclosed embodiments.

FIG. 7 illustrates an alternative charging system that uses an acoustic output to charge a portable media player in accordance with the disclosed embodiments. In the acoustic charging system illustrated in FIG. 7, an earphone 404 is fitted into a recess in an acoustic charger 702. This recess can be lined with a rubber gasket to achieve a tighter fit. Next, a speaker 704 within acoustic charger 702 produces an acoustic signal which causes a corresponding speaker in earphone 404 to vibrate. These vibrations cause a transducer within speaker 706 to effectively operate "in reverse" to generate a current in earphone conductors 708. This current can be used to charge the battery of the attached portable electronic device. Note that the vibrations can be generated in a non-audible frequency range (less than 20 Hz or greater than 20K Hz) to prevent users from hearing the acoustic charging signal.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An electronic media player device that supports inductive charging, comprising:

a housing including a first conductive portion configured to function as a first contact on a surface of the electronic device and a receptacle connector separate from the conductive portion;

wherein the first contact is configured to electrically couple to a second contact-from an audio cable for the electronic device after the audio cable has been wound multiple times around a charging mechanism, so that one or more conductors in the audio cable form an inductive receiving coil, wherein the audio cable includes a plug connector, wherein electrically coupling the first and second contacts and the plug and receptacle connectors completes a high-speed inductive charging circuit between the inductive receiving coil and the electronic device;

a processor and memory configured to play media files;

a battery within the electronic device; and a charging circuit within the electronic device, wherein the charging circuit is configured to use a current induced by a magnetic field and received from the inductive receiving coil to charge the battery;

wherein the second contact is a second conductive portion located on a first earphone attached to the audio cable.

2. The electronic device of claim 1, wherein the one or more conductors within the audio cable include multiple conductors which are coupled in series to form a single receiving coil having more windings than an audio cable with only a single conductor.

3. The electronic device of claim 1, wherein the audio cable comprises one of:
a headphone cable;
an earphone cable; and
a microphone cable.

4. An audio device that supports inductive charging, comprising:
a first earphone;
a second earphone;
a cable including one or more conductors coupled between the first earphone and the second earphone;
an audio player which produces audio signals for the first earphone and the second earphone, wherein the audio player is incorporated into one or both of the first earphone and the second earphone;
a rechargeable battery incorporated into one or both of the first earphone and the second earphone;
a first conductive mesh screen configured to function as a first contact on the first earphone, wherein the first conductive mesh protects a first driver of the first earphone;
a second conductive mesh screen configured to function as a second contact on the second earphone, wherein the second conductive mesh protects a second driver of the second earphone; and
a charging circuit incorporated into one or both of the first earphone and the second earphone, wherein the charging circuit is configured to use a current induced by a magnetic field and received from an inductive receiving coil to charge the rechargeable battery, the inductive receiving coil having been formed by winding the cable multiple times around a charging device and electrically coupling the first contact and the second contact to complete a high-speed inductive charging circuit containing the inductive receiving coil.

5. The audio device of claim 4, wherein electrically coupling the first and second contacts involves electrically coupling the first and second contacts through an intervening conductor, wherein the intervening conductor is located in a housing which is configured to receive the first and second earphones.

6. The audio device of claim 4, wherein the one or more conductors within the audio cable include multiple conductors which are coupled in series to form a single receiving coil having more windings than an audio cable with only a single conductor.

7. A first earphone for an audio device, comprising:
an earphone body;
an earphone cable coupled to the earphone body, wherein the earphone cable carries an electrical audio output for the earphone;
an audio driver housed within the first earphone body, wherein the audio driver converts the electrical audio output into an acoustic audio output; and
a first conductive metal mesh screen coupled to the earphone body, wherein the screen is configured to protect the audio driver while allowing the acoustic output to emanate from the audio driver;
wherein the screen is further configured to function as a first electrical contact for an electrical charging signal;
wherein the first electrical contact is configured to electrically couple to a second electrical contact from the earphone cable from the audio device after the earphone cable has been wound multiple times around a charging mechanism, so that one or more conductors in the earphone cable form an inductive receiving coil, wherein electrically coupling the first and second electrical contacts completes a high-speed inductive charging circuit between the inductive receiving coil and the audio device,
wherein the charging circuit is configured to use a current induced by a magnetic field and received from the inductive receiving coil to charge a battery of the audio device;
wherein the second electrical contact is a second conductive metal mesh screen located on a second earphone attached to the earphone cable.

8. The first earphone of claim 7, wherein the earphone cable is also configured to carry the electrical charging signal back to an electronic device which generated the electrical audio input, wherein the electrical charging signal is used to charge the electronic device.

9. The electronic device of claim 1, wherein the housing further includes a magnetic element.

10. The audio device of claim 4, wherein at least one of the first and second earphones includes a magnetic element.

11. The first earphone of claim 7, wherein the earphone body houses a magnetic element.

* * * * *